Oct. 8, 1957 LA VERNE R. PHILPOTT ET AL 2,809,286
PULSE TRANSMITTER SYSTEMS
Original Filed April 30, 1940 8 Sheets-Sheet 1
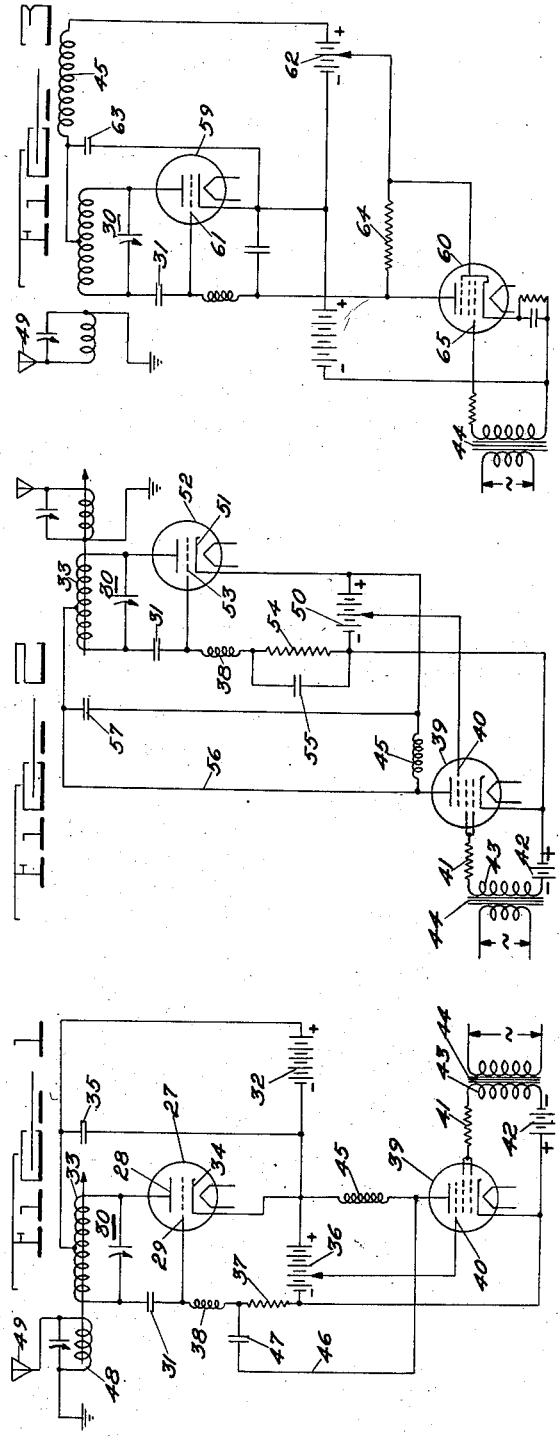
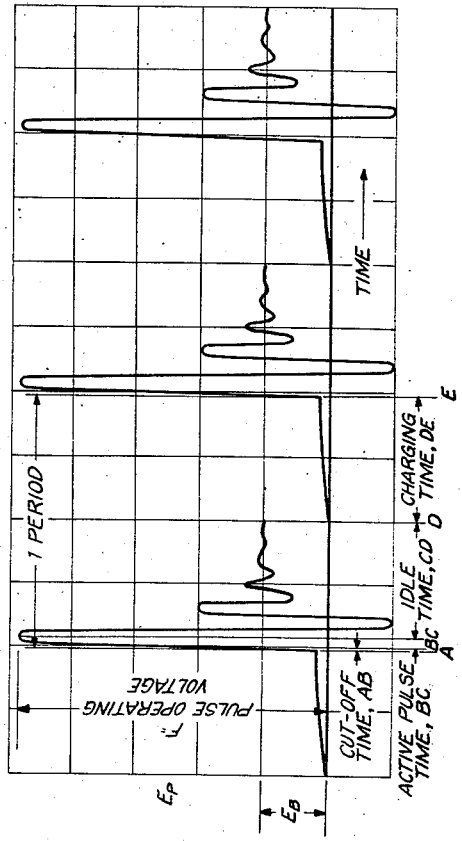
INVENTOR
LaVerne R. Philpott
Robert M. Page
BY
ATTORNEY

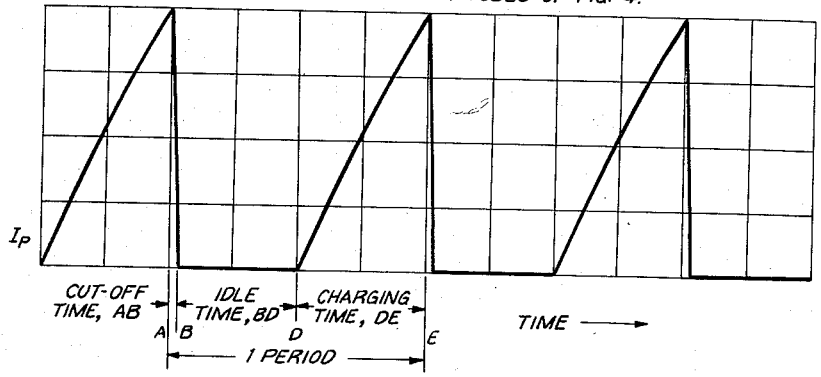
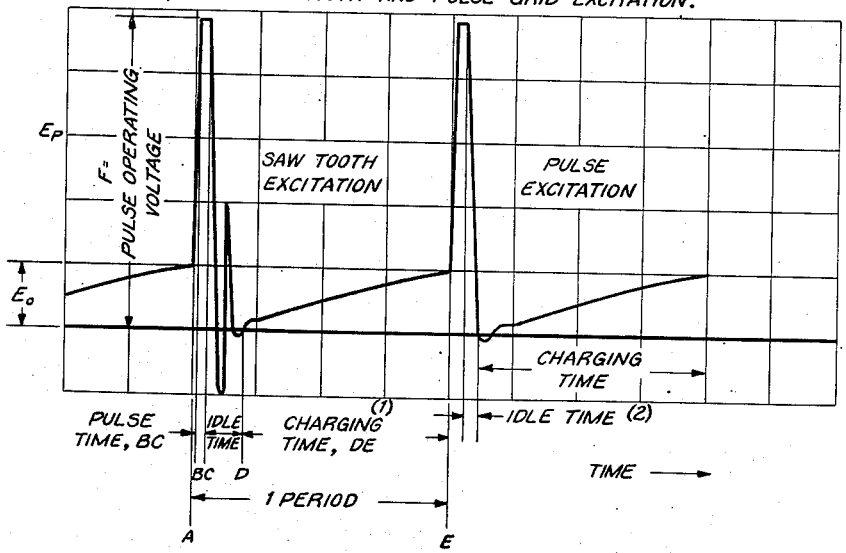

Oct. 8, 1957 LA VERNE R. PHILPOTT ET AL 2,809,286
PULSE TRANSMITTER SYSTEMS
Original Filed April 30, 1940 8 Sheets-Sheet 3
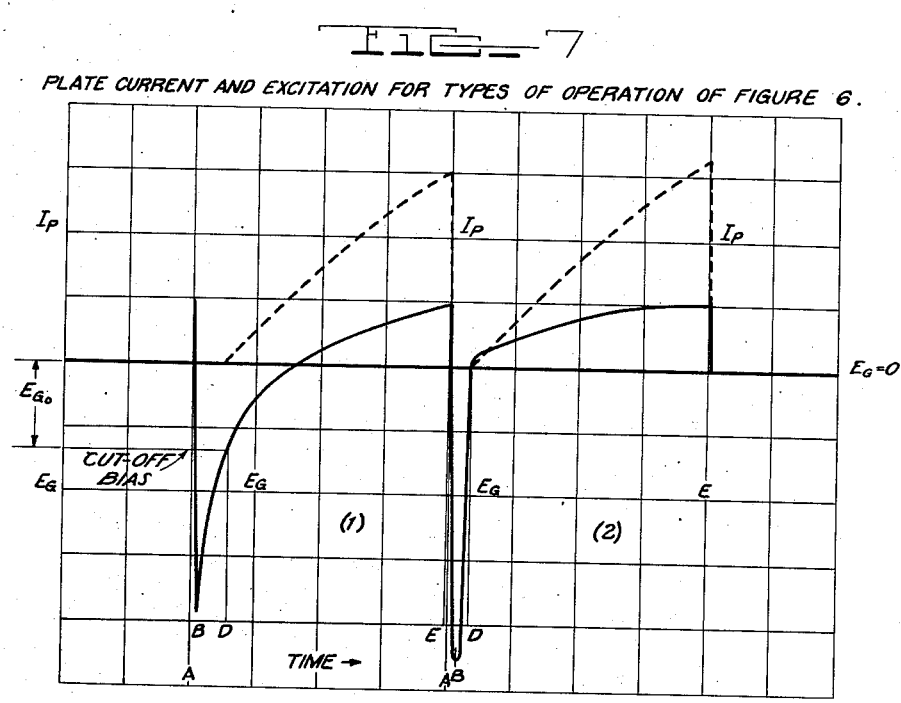
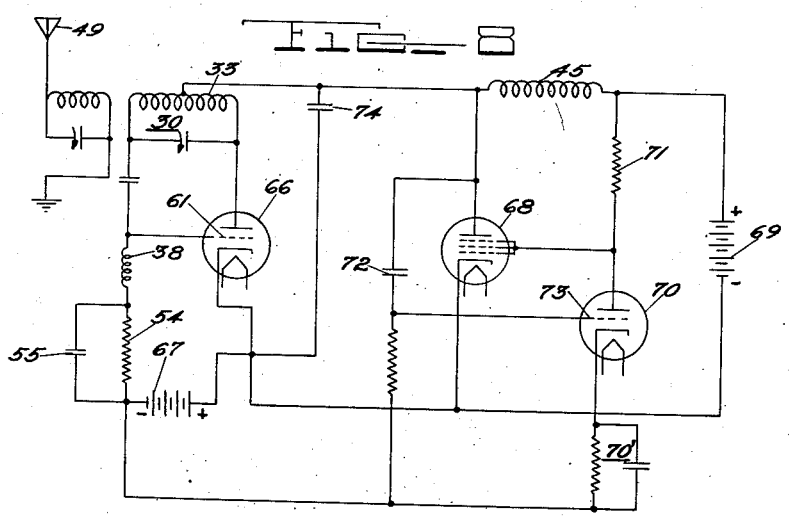
INVENTOR
LaVerne R. Philpott
BY Robert M. Page
ATTORNEY

OPERATING POTENTIAL BETWEEN POINTS 103 & 111 OF FIG. 9

POTENTIAL BETWEEN POINTS 97-99 & 92 OF FIG. 9.

POTENTIAL BETWEEN POINTS 100 & 92 OF FIG. 9

INVENTOR
La Verne R. Philpott
Robert M. Page
BY
ATTORNEY

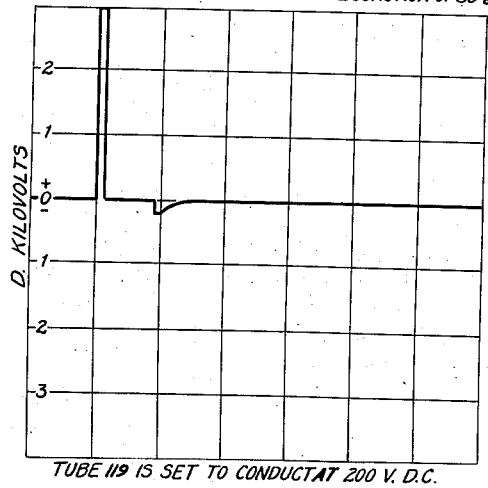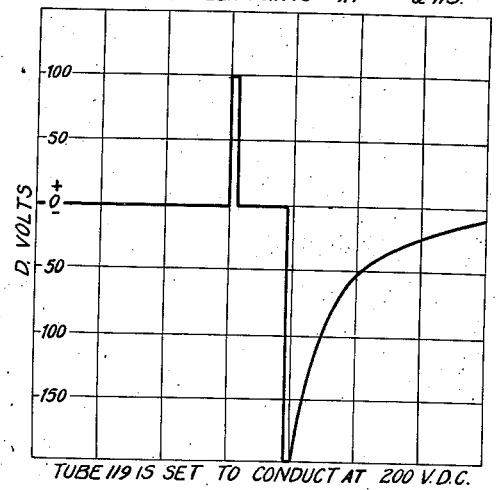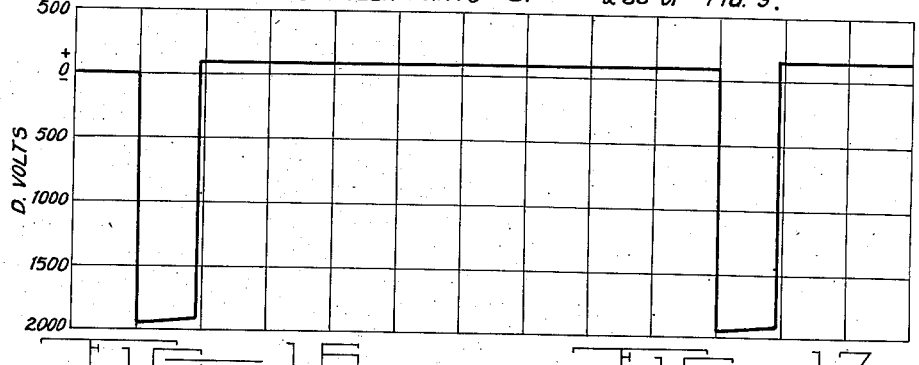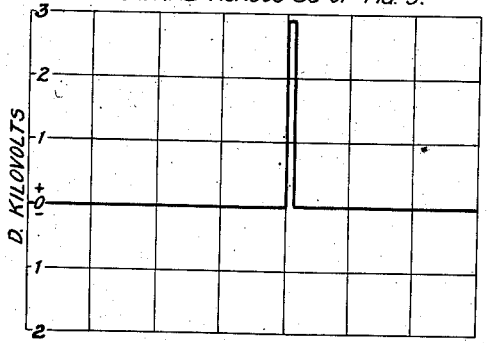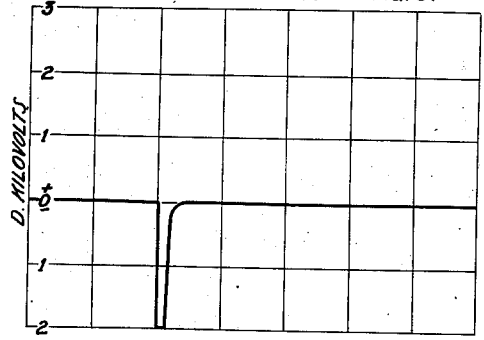

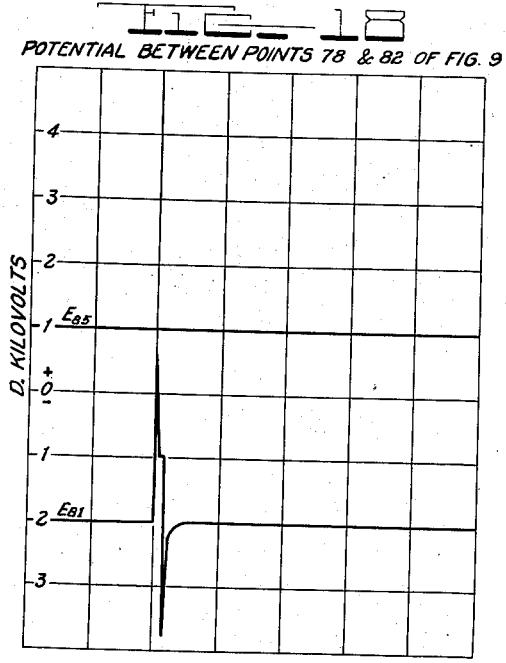
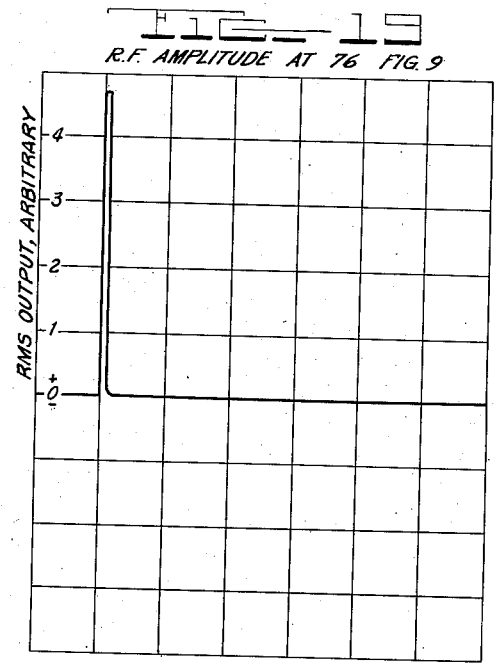
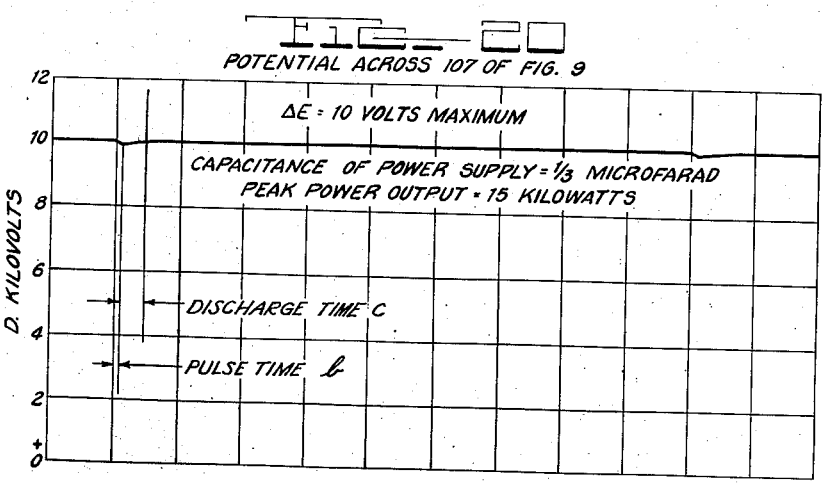

Oct. 8, 1957   LA VERNE R. PHILPOTT ET AL   2,809,286
PULSE TRANSMITTER SYSTEMS
Original Filed April 30, 1940                 8 Sheets-Sheet 7
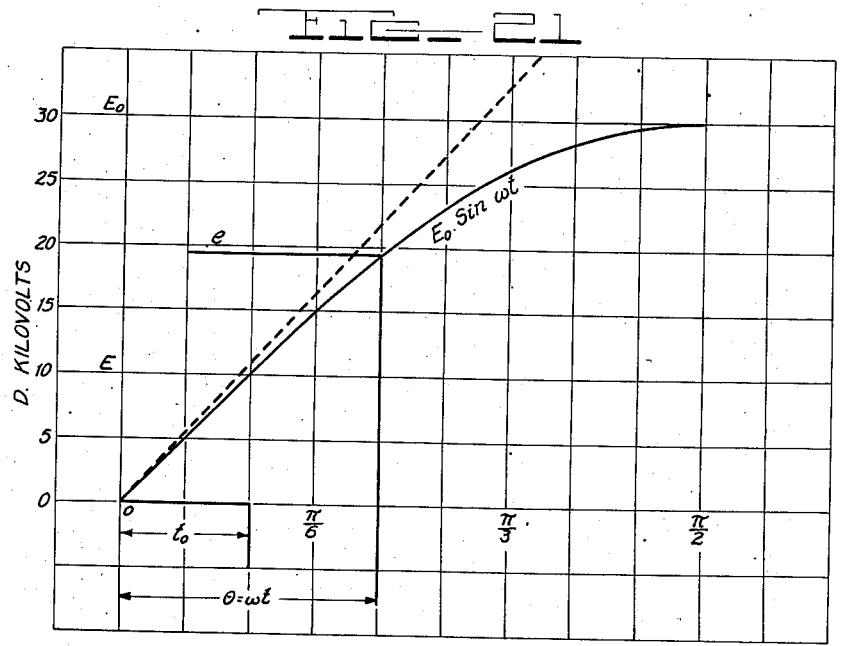
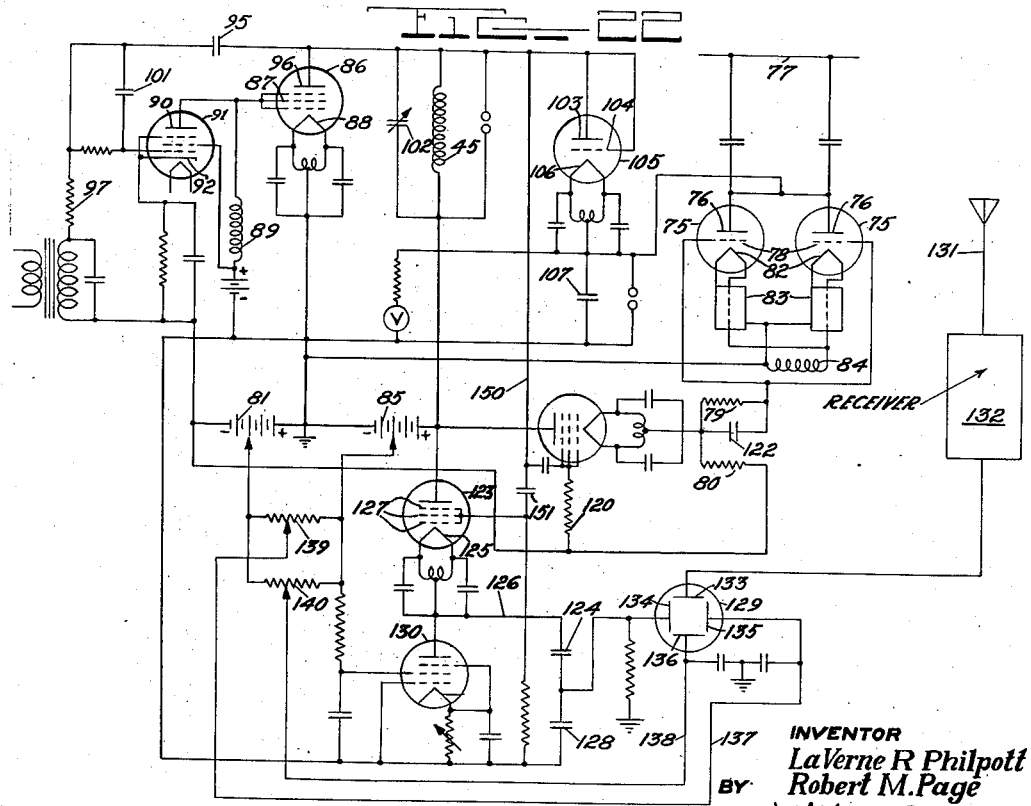
INVENTOR
LaVerne R Philpott
Robert M. Page
BY
ATTORNEY

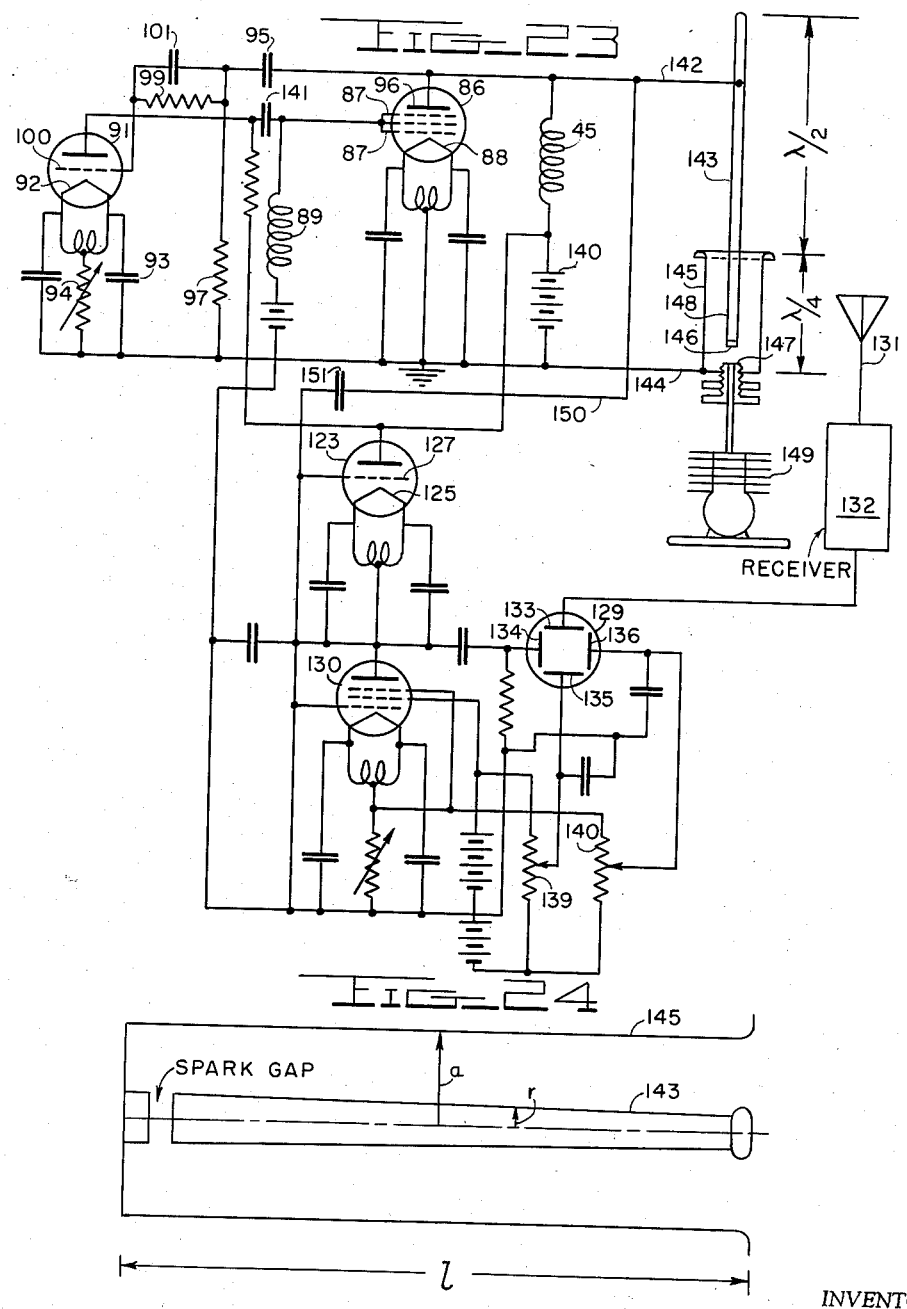

United States Patent Office 2,809,286
Patented Oct. 8, 1957

---

2,809,286

PULSE TRANSMITTER SYSTEMS

La Verne R. Philpott, Caldwell, N. J., and
Robert M. Page, Camp Springs, Md.

Original application April 30, 1940, Serial No. 332,526.
Divided and this application March 3, 1952, Serial No. 274,643

8 Claims. (Cl. 250—17)

(Granted under Title 35, U. S. Code (1952), sec. 266)

This application is a division of our application for Pulse Transmitter Systems, Serial No. 332,526, filed April 30, 1940, now abandoned.

This invention relates to high frequency pulse transmitting apparatus and more particularly to means for supplying power at high levels and means for keying the system, the same general principle being applied to both vacuum tube and spark transmitters.

Among the several objects of this invention are:

To provide simple and economical means of setting up a very short pulse of radio frequency energy of high intensity;

To provide means for supplying pulsing energy to a large transmitter from a relatively small source;

To devise a spark transmitter that is self-pulsing.

In the drawings:

Fig. 1 depicts our invention embodied in a system wherein the voltage of the plate voltage of the transmitter tube is equal to the voltage of the plate power supply, the transmitter keying voltage being supplied by energy stored in accordance with this invention;

The apparatus in Figs. 2 and 3 is in general similar to Fig. 1 except that the supply voltage is less than the operating voltage of the transmitter tube.

Fig. 4 shows graphically the variations of plate voltage on the transmitter tube in the systems of Figs. 2 and 3 and on the keying tube in Fig. 1;

Fig. 5 is a graph depicting the plate current of the transmitter tube in Fig. 3 and keying tubes in Figs. 1 and 2.

Fig. 6 is similar to Fig. 4 but illustrates different types of excitation;

Fig. 7 shows the plate current and excitation when the conditions correspond to those in Fig. 6;

Fig. 8 illustrates another embodiment of our invention wherein the system is self-keying;

Figs. 10 to 21 are graphs illustrating the variations of potential at various points in the system of Fig. 9;

Fig. 22 depicts the form of invention in Fig. 9 associated with a sweep circuit, a cathode ray tube and the receiving apparatus for echo ranging or similar purposes;

Fig. 23 shows our invention applied to a self-keying spark transmitter, associated with cathode ray tube indicating means, as in Fig. 22; and Fig. 24 is a detail of the spark transmitter mechanism.

Figure 9:
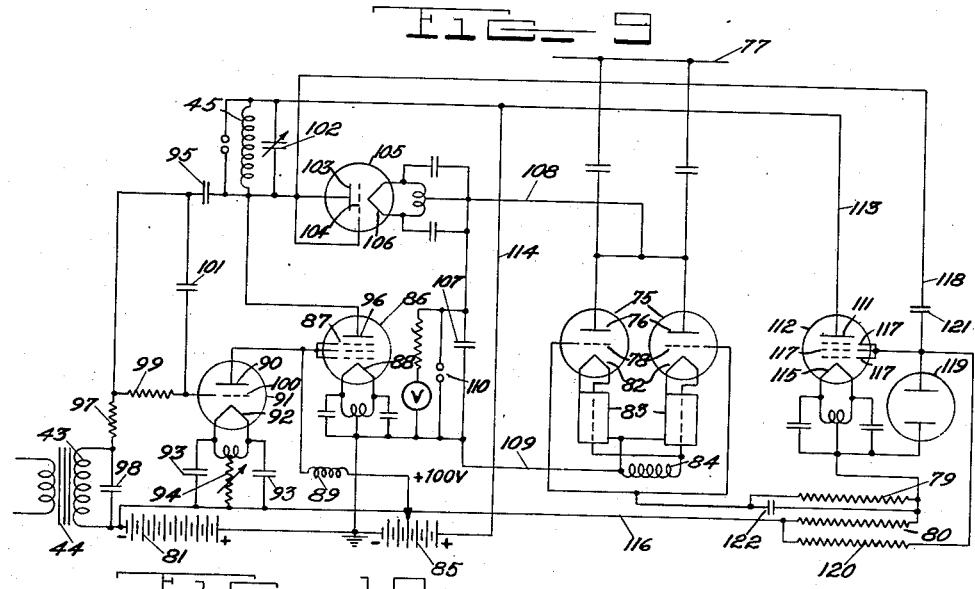
Fig. 9 shows a still further and more efficient embodiment of our invention.

There are numerous applications of high frequency radiant energy that require a short pulse, such as radio echo ranging, etc. The production of such a pulse is difficult because of the extremely short duration of the pulse that is required, in some cases as little as $10^{-7}$ seconds. Another difficulty is the necessity of radiating a high peak power, say 15 kilowatts, which is complicated by the fact that there must be no appreciable radiation at or near the radio carrier frequency or any of its sub-harmonics during the interval between pulses.

As a general illustration of our present invention we will cite the case of a self-oscillating circuit to which is continuously applied plate potential of the value required for operation and a negative grid bias capable of extinguishing oscillations, except during those intervals when it is removed to permit radiation of a pulse. The transmitter may consist solely of this stage or it may have additional power amplifier stages. This type of circuit is shown in Fig. 1 wherein the tube 27 is the transmitter tube whereof the anode 28 and grid 29 are connected by the parallel oscillatory circuit 30 and 33 and capacitance 31. The energy radiated by tube 27 is supplied by source 32 having its positive terminal connected to inductance 33 of oscillatory circuit 30 and 33 and its negative terminal connected to cathode 34 of tube 27, a capacitance 35 being connected in parallel across source 32. Negative bias sufficient to block tube 27 is applied to grid 29 by source 36 through resistance 37 and grid impedance 38.

Tube 39 is a power pentode biased for class B operation, having its control grid and screen grid connected together for high simplification factor, and its suppressor grid 40 connected to source 36 at 45 volts positive to lower the plate voltage during the charging time DE, Fig. 4. The screen and control grids of tube 39 are connected through grid current limiting resistance 41 to source 42 that applies a negative bias to these grids, there being included in the grid circuit the secondary 43 of a transformer 44 for applying keying voltages.

The operation of this form of the invention is as follows: When a keying pulse is applied through transformer 44, the screen and control grids of tube 39 are swung positive and a heavy current flows from source 36 through inductance 45 and tube 39, with resultant storage of energy in inductance 45. When the grids of tube 39 go rapidly negative, the energy stored in inductance 45 is released by the collapse of the electromagnetic field and, since tube 39 is again blocked, this energy flows through lead 46, capacitance 47 and resistance 37, thereby impressing a high positive potential on grid 29 of tube 27 that unblocks tube 27 and permits current to flow through tube 27 with the resultant generation of oscillations in oscillatory circuit 30 and 33, which oscillations are filtered by tuned circuit 48 coupled to circuit 30 and 33 and radiated by antenna 49.

Referring now to Fig. 4, the time DE is the interval during which tube 39 is conducting and is storing energy in inductance 45, practically all of the applied voltage 36 being dropped across inductance 45. As the current through the pentode 39 increases, the anode potential thereof rises along the $E_p$—$I_p$ curve characteristic of the tube. At the time A or E, Figs. 4 and 5, the instantaneous voltage applied to the grids of 39 is rapidly becoming negative and has reached the point at which any further increases of plate current would result in a very sharp increase in plate voltage. At this instant, the energy stored in inductance 45 is $½LI_0^2$. The time interval AB, called the cut-off time, is that portion of the cycle during which the grids of tube 39 change from the full conduction potential to full cut-off and should be as short as possible.

When cut-off occurs, the energy stored in inductance 45 is released and flows through capacitance 47 and resistance 37, as above stated and also to some extent through the anode-ground capacitance of tube 39, the grid input impedance of tube 27 and capacitance 31. Designating all the capacitances involved as C, then the system will charge to some potential until $$½LI_0^2 = ½CE_0^2$$

and this will occur in ¼ cycle of a frequency as determined by the product LC, where L designates the value of inductance 45. This frequency can be made very high. At the time C, Fig. 4, the current in inductance 45 is zero and all the residual energy not spent in a resistive load is stored in the combined shunt capacitance across inductance 45 at some voltage. This energy then surges back and forth between capacitance and inductance until it is dissipated in circuit resistance, of which 37 is the major part. Should any appreciable oscillating energy exist in inductance 45 at the time D, when tube 39 is again made conducting for charging inductance 45, it will be quickly damped by the reduction of plate resistance of tube 39. If the grid of tube 27 draws current at a potential lower than that to which the combined capacitance C would finally charge, the remainder of the energy will be dissipated at that level. This condition is represented by a flat top on the oscillation peak, as in Fig. 6, BC.

It is apparent that the longer the charging time the more energy can be delivered at a particular supply voltage and pulse frequency. By altering the grid excitation from sine wave to vertical saw tooth or negative pulsing, the proportion of charging to discharging time can be altered say to a ratio of 10 to 1 instead of 1 to 1, as in the sine wave type. These modes of operation are illustrated in Figs. 6 and 7, wherein the notation is the same as in Figs. 4 and 5. While tube 39 is shown as a pentode for best practical operation, a triode or tetrode can be substituted and work equally well provided the grid is properly controlled.

The polarity of the pulse derived from inductance 45 is such as to oppose the action of bias potential 36 with the result that, for the time BC, Fig. 4, the transmitter tube is not blocked and will oscillate normally. It is evident that when tube 27 is operated in the manner described, the average power dissipation is much lower than would be for continuous transmission and, as a result, tube 27 can be operated at extremely high instantaneous outputs. A tube rated to operate continuously at 2,000 volts will operate at 5,000 to 10,000 volts while pulsing, so far as dissipation is concerned. One feature or disadvantage in the system of Fig. 1 is the unavoidable large size of source 32, which becomes the largest physical part of the system.

Fig. 2 depicts a system wherein the energy for the pulse is derived from a source 50 of much lower potential than that at which the pulses are radiated. The cathode 51 of tube 52 is connected to the positive terminal of source 50 and the grid 53 is connected to the negative terminal thereof through radio frequency impedance 38, resistance 54 and capacitance 55. The positive terminal of source 50 is likewise connected through storage inductance 45 to the anode of tube 39 and, through lead 56, to inductance 33 of oscillatory circuit 30 and 33, the capacitance 57 being in parallel with inductance 45.

When tube 39 is rendered conducting by a positive half cycle through transformer 44, energy is stored in inductance 45, the anode voltage of tube 39 rising along its characteristic curve as above described. When tube 39 is again blocked, the energy stored in inductance 45 discharges into capacitance 57 until the latter is charged to a potential sufficiently great that, applied to the anode of tube 52, it overcomes the blocking bias and permits energy in capacitance 57 to discharge through tube 52 with concomitant generation and radiation of a pulse of high frequency energy. When the energy transferred to capacitance 57 from inductance 45 is dissipated, the anode potential on tube 52 drops, the tube again blocks and the pulse is complete.

It may be readily shown that with the source 50 having a voltage of 1,000 volts, inductance 45 having a value of 0.407 henry, a maximum charging current through tube 39 of 0.7 ampere and the other elements of the system having such values as to give a pulse frequency of 3,000 per second, the level at which radiation occurs is in the vicinity of 10,000 volts. It may further be shown that if the stored energy is discharged in 5 microseconds, the pulse power input is 20 kilowatts but if it be dissipated in 2 microseconds, the power reaches 50 kilowatts.

The apparatus shown in Fig. 3 differs somewhat from that shown in Figs. 1 and 2, although the general principle is the same. Here, the tube 59 serves the double purpose of controlling the storage of energy and generating the radio frequency oscillations, the tube 60 being merely a keying tube to provide excitation for grid 61 of tube 59. It will be noted that the positive terminal of source 62 is connected to the anode of tube 59 through storage inductance 45 and the negative terminal thereof is connected to the cathode of tube 59, the capacitance 63 being connected at one side to a point between oscillatory circuit 30—33 and inductance 45 and to the other side at the cathode of tube 59. Under these conditions current will flow through tube 59 and inductance 45 with the resultant storage of energy in inductance 45, since grid 61 is connected through resistance 64 to a point of positive potential on source 62 but no oscillations will be generated because grid 61 is at a potential more positive than the plate. When a keying impulse is applied through transformer 44 to grid 65 of tube 60, this tube draws current and the resulting drop in potential across resistance 64 is applied to grid 61 and momentarily blocks tube 59, whereupon the energy stored in inductance 45 is discharged into capacitance 63, which is thereby charged to a high voltage. Radio frequency oscillations will occur when the anode potential rises high enough to unblock tube 59 against the applied negative grid bias across 64, and will continue until condenser 63 is substantially discharged and tube 59 becomes again blocked. When tube 60 again blocks after the cessation of the keying voltage on grid 65, tube 59 unblocks with low anode potential and energy is again stored in inductance 45.

Even if tube 59 does not become completely blocked, still its plate potential is forced very high by impressing a high negative potential on grid 61 which gives rise to a transient high powered radio pulse. Under certain conditions tube 59 may not completely cease oscillating at the desired radio frequency during the charging time, yet there still will exist a large difference in the radiated power between steady and pulse conditions.

It is apparent that if tube 60 and the elements immediately associated therewith are omitted, the apparatus in Fig. 3 will become self-pulsing, the blocking of tube 59 being effected by the drop of potential in resistance 64 due to flow of rectified grid current therethrough.

In the case of Fig. 3, as also in those of Figs. 1 and 2, the introduction of a saw tooth or pulse excitation on the grid of tube 60 instead of sine wave excitation will facilitate a higher powered pulse for the same pulse frequency and supply volts available, since the more abrupt wave front will effect the change in conductive condition in a shorter time. This is evident from a comparison of Figs. 4 and 6, wherein it is seen that the idle time CD is much less when saw tooth or pulse grid excitation is employed as in Fig. 6 instead of the sine wave excitation in Fig. 4. This allows a longer charging period with a possible increase of either the inductance value 45 or the final plate current of tube 39 or 59, namely $I_0$.

Fig. 7 shows graphically the relation between the excitation voltage and the plate current in the apparatus of Figs. 1, 2, and 3 when saw tooth and pulse grid excitation, respectively, are applied. It is believed that the captions of these figures of the drawings render detailed discussion thereof unnecessary.

Fig. 8 illustrates another self-keying pulse transmitter embodying the energy storage principle of the present invention. Here the grid 61 of transmitter tube 66 has applied to it a blocking potential from the source 67. The anodes of transmitter tube 66 and of charging tube 68 are connected to the positive terminal of source 69 through storage inductance 45, while the anode of keying tube 70 is connected to the positive terminal of source 69 through resistance 71. Tube 68 draws current from source 69 through inductance 45 and stores up energy in the inductance, the potential on the anode of tube 68 rising gradually until the current reaches a critical value, tube 70 meanwhile being blocked by cathode self-biasing circuit 70'. However, when the current through tube 68 reaches the critical value, the anode potential thereof rises very quickly and this rise in potential is transmitted through capacitance 72 to grid 73 of tube 70 and unblocks tube 70.

The flow of current through tube 70 gives rise to a drop in potential across resistance 71 which is impressed upon the grids of tube 68 and blocks this latter tube. The energy stored in inductance 45 is thereupon transferred to capacitance 74 and when the potential thereof, which is impressed upon the anode of tube 66, rises to a sufficient value tube 66 is unblocked and the energy in capacitance 74 is discharged through tube 66 and oscillations at high power level and high frequency are generated. The dissipation of the energy stored in inductance 45 results in the blocking of tube 70 and the tube 68 again passes current. It is apparent that this is a self-keying transmitter system.

If extremely high peak power is required from the radio transmitter the energy stored in inductance 45 must be transferred to capacitance 74 before the pulse begins, else the peak average plate current of tube 66 cannot exceed the peak current in tube 68 and this imposes a serious limitation upon the maximum applied voltage. Simply to transfer the energy from inductance 45 to capacitance 74 prior to the radio pulse and then to permit capacitance 74 to discharge through tube 66 would result in an unduly long pulse and a large change of applied potential throughout the operating period. Particularly at the higher carrier frequencies, the frequency depends so largely upon applied potential that a 100% change in applied voltage may result in a frequency change as large as 2%. When reception of such a signal by heterodyne receivers is attempted, circuit selectivity handicaps the system. It has been determined, however, that the frequency remains practically constant when plate potential is held fixed and the generation of the oscillations and discharge of the stored energy are controlled by changes of potential on the grid of the transmitter tube.

A system wherein the transmitter tube is unblocked by changes in grid potential is shown in Fig. 9. While this is illustrated as being an extremely high frequency system, this is not essential. The two transmitter tubes 75 have anodes 76 connected in high frequency push-pull, and delivering power through the high frequency tank circuit to the antenna 77 and their grids 78 connected in high frequency push-pull and through resistances 79 and 80 to the negative terminal of source 81, the cathodes 82 being supplied through high frequency push-pull impedance 83 from a transformer secondary 84.

Energy for generating the pulses is drawn from source 85 through storage inductance 45 and power pentode 86 having its three grids 87 connected together and its cathode 88 connected to the negative terminal of source 85 and to ground, the grids 87 being connected through impedance 89 to a point 100 volts positive on source 85. Anode 90 of blocking tube 91 is also connected to the 100 volts positive point on source 85 through impedance 89, the cathode 92 of tube 91 being connected to the negative terminal of source 81 through capacitances 93 in parallel with variable resistance 94. Capacitance 95 is connected at one side to a point between inductance 45 and anode 96 of tube 86 and at its other side to a time constant resistance 97 that is connected through transformer secondary 43 to the negative terminal of source 81. Capacitance 98 completes the circuit for the synchronizing pulses applied through transformer 44.

Grid resistance 99 is connected to a point between capacitance 95 and resistance 97 and to grid 100 of blocking tube 91 and is bypassed by a small capacitance 101. A variable capacitance 102 is connected in parallel with storage inductance 45, and the terminals of inductance 45 and capacitance 102 that are connected to anode 96 are connected to the anode 103 and grid 104 of a rectifier tube 105 whereof the cathode 106 is connected to storage capacitance 107 that supplies energy to anodes 76 and cathodes 82, respectively, of transmitter tube 75 through leads 108 and 109, respectively. It is to be understood that capacitance 107 is much larger than the analogous capacitances of the previously described systems. A safety gap 110 is connected across storage capacitance 107.

Anode 111 of keying tube 112 is connected through leads 113 and 114 to the positive terminal of source 85 and the cathode 115 thereof is connected through resistance 80 and lead 116 to the negative terminal of source 81 which is in series with source 85. Tube 112 is a pentode having its grids 117 connected together and, through lead 118 and capacitance 121, to the anode 103 of rectifier tube 105 and likewise to the anode 96 of tube 86. A reduced pressure safety gap 119 is connected between grids 117 and cathode 115 of keying tube 112.

The operation of this form of our invention is as follows: After one cycle of operation, the cathode 92 of tube 91 is held positive by the charge on capacitances 93 and hence tube 91 is blocked and draws no current. The grids 87 of charging tube 86 are 100 volts positive by their connection to source 85 and the anode 96 is likewise positive due to its connection to the positive terminal of source 85. Transmitter tubes 75 are blocked by connection of grid 78 to the negative terminal of source 81, as is keying tube 112 by virtue of its grids 117 being held negative relative to cathode 115 by charge on condenser 121.

Under the conditions above set forth, tube 86 will draw current through storage inductance 45 with concomitant storage of energy therein and the voltage on anode 96 will rise along the $E_p$—$I_p$ curve of tube 86 until a critical value of current is reached, when the voltage on anode 96 will increase very rapidly. This pulse of positive voltage is transmitted through capacitance 95 and small capacitance 101 to grid 100 of blocking tube 91 which is thereby unblocked and begins to draw current through impedance 89, and the resulting drop through impedance 89 is applied to grids 87 of tube 86 to block the charging tube 86. Capacitance 95 must charge through time constant resistance 97 and the duration of this charge is given such value that tube 91 is held conducting, and thereby tube 86 is held blocked, until the energy stored in inductance 45 is transferred through rectifier tube 105 to storage capacitance 107, the rectifier 105 having been rendered conducting by the high positive potential developed on the anode 96 of tube 86. The purpose of rectifier tube 105 is to prevent the high potential of storage capacitance 107 working back into the other elements of the system.

As soon as the potential on anode 96 begins to increase rapidly, a positive pulse is impressed upon grids 117 of keying tube 112 through lead 118 and capacitance 121, which unblocks keying tube 112 and the resultant flow of current through tube 112 and resistance 80 in series therewith gives rise to a positive potential that is impressed upon grids 78 of transmitter tubes 75 through small capacitance 122, thereby transiently unblocking transmitter tubes 75 and permitting the discharge of energy from storage capacitance 107 through the transmitter tubes 75, with the concomitant generation of a very short pulse of extremely high frequency energy at a high power level, the pulse being radiated from antenna 77. It is to be understood that the generation and radiation of the pulse take place during the rise of potential on anode 96 and that the pulse is substantially complete before rectifier 105 has become conducting to transfer to storage capacitance 107 the energy in storage inductance 45. The transmitter tubes 75 in Fig. 9 being grid voltage controlled, objectionable frequency changes arising from anode voltage control are eliminated.

By way of example, if inductance 45 have a value of 0.407 henry, the pulse frequency be 3,000 pulses per second and the peak current through inductance 45 be 0.7 ampere, the energy stored per cycle is $\frac{1}{2}LI_0^2$ or 0.10 joule. If the integrated value of capacitances 95, 102 and 121 be 350 micromicrofarads, the peak voltage to which capacitance 107 would charge in the absence of any drain would be 23,900 volts.

Figure 10:
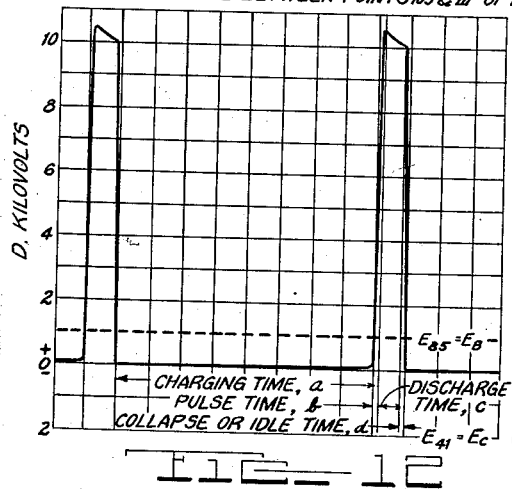

Consideration of the graphs in Figs. 10 to 21 will aid in understanding the sequence of voltage and current conditions in various parts of the system of Fig. 9 during a cycle. Referring first to Fig. 10, the charging time $a$ is that interval during which the tube 86 is passing current and storing up energy in the storage inductance 45. When the critical value of current is reached and the potential on anode 96 begins to rise rapidly the impulse of positive potential is transmitted through lead 118 and capacitance 121 to the grids of tube 112 giving rise to the pulse which is designated by $b$ in Fig. 10. It will be noted that this is very short and occurs during the rapidly rising anode potential. The discharge time $c$ is the interval during which the energy is being transferred from inductance 45 through rectifier 105 to capacitance 107, and the collapse or idle time $d$ is the interval during which the potential on anode 96 is dropping. It will be observed that the potential of anode 96 reaches a value in excess of 10 kilovolts.

Figure 11:
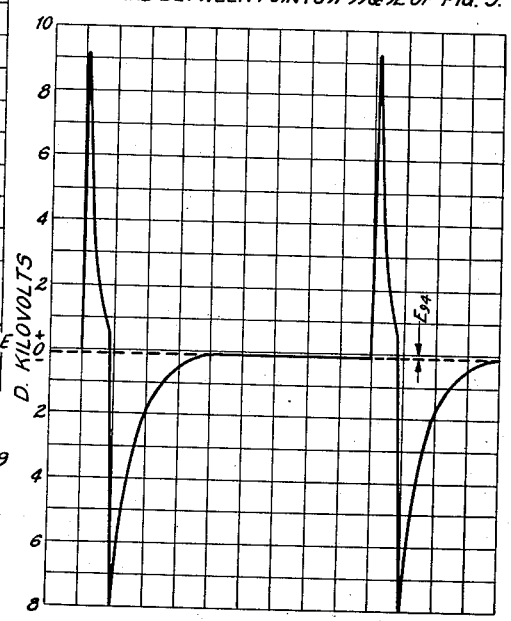
Figure 12:
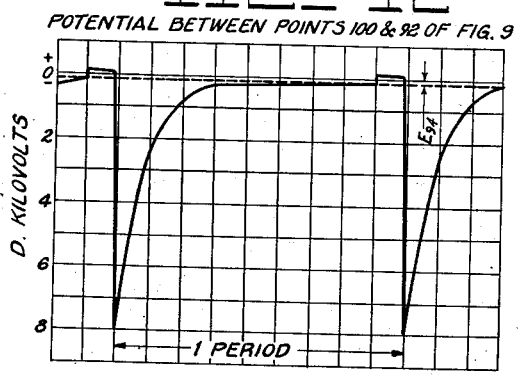

Fig. 11 shows the excitation potential at the junction of resistances 99 and 97, while Fig. 12 shows the actual grid excitation of tube 91. It will be understood that when a very high positive excitation is applied to grid 100 this grid will tend to draw a heavy grid current which would charge condenser 95 too rapidly, and consequently resistance 99 must be of sufficient value to hold this current to an allowable value.

Fig. 13 shows the excitation between grids 117 of tube 112 and the negative side of source 81 while Fig. 14 illustrates the net effective voltage on the grids of tube 112. It will be observed in Fig. 14 that the maximum positive voltage on grids 117 is 100 volts and consequently setting safety gap tube 119 to discharge at 200 volts allows an ample margin for voltage variation during operation and yet the tube will be protected against negative potential swings on the grids 117 sufficiently great to damage the same. If tube 112 is sufficiently well insulated to withstand the full excitation, tube 119 may be eliminated with no effect on the operation save that it will require a longer time for condenser 121 to discharge through resistance 120.

Fig. 15 depicts the grid potential on tube 86. Fig. 16 depicts graphically the potential developed across resistance 80 by the flow of current through tube 112 and consequently the voltage applied to grid 78 of transmitter tubes 75. Fig. 17 shows the drop across resistance 79 due to grid current from the transmitter tubes 75, while the net operating potential on transmitter grids 78 is shown in Fig. 18, the resultant amplitude of the radio frequency pulse being plotted in Fig. 19.

Fig. 20 shows the small ripple voltage across capacitance 107 due to discharging through tube 75 and the charging through tube 105 where capacitance 107 has a value of ⅓ microfarad and the peak of transmitter input power is 15 kilowatts.

Fig. 22 illustrates the form of our invention described in connection with Fig. 9 associated with a receiver, a cathode ray tube and suitable sweep circuits for the cathode ray tube to utilize our invention in echo ranging work. The elements in Fig. 22 that are common to this figure and Fig. 9 are designated by the same reference characters. Tube 123 is a pentode connected for high current capacity and is blocked the greater part of the time by positive potential due to a charge residing on capacitances 124 and 128 to which cathode 125 is connected by lead 126. However, when the potential on anode 96 of tube 86 begins its rapid increase a positive potential is impressed upon grids 127 of tube 123 that unblocks tube 123 and permits a quantity of electrical energy to pass through tube 123 and be stored in capacitances 124 and 128. This moves the spot on the screen of cathode ray tube 129 to its initial position simultaneously with the unblocking of transmitter tubes 75 and the transmission of the pulse. The charge on capacitances 124 and 128 flows off through tube 130 which is so connected as to constitute a constant current device and hence the potential on capacitances 124 and 128 decreases at a uniform rate and the spot is moved linearly across the screen of cathode ray tube 129. If the transmitted pulse is reflected by a distant body, the reflection is picked up by antenna 131 and is suitably amplified in a receiver 132 whereof the output is connected to plate 133 of the cathode ray tube 129 to move the spot at right angles to the motion thereof effected by the potential on capacitances 124 and 128.

The screen of the cathode ray tube 129 may be calibrated in terms of distances whereby the point of deflection of the cathode ray beam by a signal from receiver 132 will indicate the distance to the reflecting object, as is well known in this art. The capacitances 124 and 128 constitute a potential divider and their values are so chosen that the effect thereof on the beam in cathode ray tube 139, exerted through plate 134, moves the spot as desired. Plates 135 and 136 of cathode ray tube 129 are connected by leads 137 and 138, respectively, to the variable resistances 139 and 140 to adjust the initial position of the cathode ray tube spot. Receiver 132, for satisfactory functioning, must be of a type specifically adapted for the ultra high frequencies employed and should have a very high amplifying power to make possible the reception of extremely faint echoes from remote objects, and may be like the receiver shown in the application of Leo C. Young and Robert M. Page, Serial No. 223,502, filed August 6, 1938, now Patent No. 2,554,515.

Fig. 23 is a schematic diagram of a spark type transmitter supplied with energy for transmitting pulses by means of energy stored as above described. Due to the fact that several of the elements in this figure have functions identical with those of corresponding elements in Fig. 9, the same reference characters will be applied. Tube 86 is a pentode that draws energy from source 140 through storage inductance 45 and the rise of potential on anode 96 is transmitted through capacitance 95 and capacitance 101 to grid 100 of blocking tube 91 that is normally held non-conducting by positive charges on capacitances 93 connected in parallel with resistance 94 to cathode 92. The grid resistance 99 and time constant resistance 97 are the same as in Fig. 9. When tube 91 is rendered conducting it draws current through inductance 89 and the potential drop resulting is applied to grids 87 of tube 86 to block the charging tube 86. Capacitance 141 is sufficiently large to conduct freely the alternating current components of anode cathode current of tube 91.

When tube 86 is blocked the energy stored in inductance 45 is discharged through lead 142 to interior concentric line member 143 and lead 144 to exterior concentric line member 145, charging up the capacitance of the said concentric line members to a point that the gap 146 between spark electrode 147 and the adjacent end 148 of the interior concentric line member breaks down and the charge is dissipated in spark oscillations. The exterior member 145 is ¼ wave length long and the interior member 143 extends ½ wave length beyond the outer end of the exterior member 145 to constitute an effective radiator.

It will be noted that the concentric line members 143 and 145 replace the storage capacitances 107, the rectifier 105, the transmitter tubes 75, the keying tube 112, the antenna 77 and the associated circuit elements in Fig. 9. To insure proper extinction of the spark across gap 146 and to deionize the air to prevent premature discharge, a pump 149 may be provided to blow air through the hollow center of spark terminal 147. The high positive potential on anode 96 may be transmitted by lead 150 and capacitance 151 to synchronize sweep circuits of cathode ray tube 129 with the transmitted pulse whereby the distance of a reflecting object may be determined by the echo therefrom received by means of antenna 131 and receiver 132, as described in connection with Fig. 22. The length of the pulse on the spark transmitter in Fig. 23 will be effectively determined by the decrement of the system.

The invention described herein may be manufactured and/or used by or for the Government of the United States of America for governmental purposes without the payment of any royalties thereon or therefor.

What is claimed is:

1. A high frequency pulse transmitter, comprising a discharge device and elements connected thereto to constitute a self-oscillatory system, said system being normally blocked; a source of current, and in series therewith an electronic discharge device capable of being selectively rendered conducting or non-conducting and an energy storage element to store energy when said device is conducting; means to render said device recurrently conducting or non-conducting, and means to transfer to said system when said device is non-conducting the energy stored in said element as energization pulses, to unblock said system and generate a discrete multiple cycle wave train during each energization pulse only during a minor portion of the recurrence period.

2. A radio frequency impulse generator comprising energy storage means responsive to current flow therethrough to progressively store energy, recurrently operative electronic control means initiating current flow through said first-named means and abruptly terminating said current flow after a predetermined interval, means discharging said stored energy immediately following said predetermined interval into a circuit characterized to absorb said energy during a time interval extremely short relative to said predetermined interval and means responsive to said discharged energy to generate a discrete multiple cycle radio frequency impulse only during said extremely short time interval.

3. A pulse generator comprising a source of direct current, an inductor, a capacitor, a load circuit having an asymmetrical conduction characteristic, a charging circuit having an asymmetrical conduction characteristic coupling the capacitor with the inductor and so connected in shunt to said load circuit as to provide a path for current in the direction opposite to that provided by said load circuit, control means for periodically causing a current to flow from said source through said inductor to store energy therein and interrupting said flow of current whereby said energy is transferred to said capacitor through said charging circuit, and switch means periodically operative in definite time relation to operation of the control means to discharge energy thus stored in said capacitor through said load circuit.

4. In a system for producing recurrent pulses of ultra high frequency oscillations employing an oscillation generator having a cathode and an anode, a circuit for producing recurrent pulses of direct current through the cathode-anode path of said generator to cause the production of ultra high frequency oscillations comprising a direct current source, an inductor, an electric discharge device having a space path, a control electrode therefor and so connected that current from said source may flow through said space path to said inductor, means for periodically varying the voltage of said control electrode to alternately cause said space path to be conductive whereby energy from said source is stored in the magnetic field of said inductor and to block said space path, a capacitor connected in circuit with said inductor whereby the energy stored in the magnetic field of said inductor is transferred to the electrostatic field of said capacitor when said space path is blocked, and switching means for discharging the energy stored in the dielectric field of said capacitor through the anode-cathode path of said generator, said switching means comprising a second electric discharge device having a control electrode normally biased to block the space path thereof, and means controlled in definite time relation to the blocking of the space path of said first mentioned electric discharge device for impressing a positive voltage on said control electrode to trigger off said second electric discharge device.

5. A transmitter for high frequency pulses comprising a source of direct current power, power pulse forming means connected with the power source recurrently operative to generate power pulses, unilateral impedance means connected with the power pulse forming means for conducting said pulses, capacity means receiving the pulses from the unilateral impedance means, a high frequency oscillator energized by the capacity means, and oscillator control means recurrently operative at the recurrence rate of the power pulse forming means to operate the oscillator only through a minor portion of each recurrence period and to block oscillation of the oscillator during the rest of the recurrence period to generate a high frequency pulse wave train during each period.

6. A transmitter for high frequency pulses comprising a source of direct current power, power pulse forming means connected with the power source recurrently operative to generate power pulses, unilateral impedance means connected with the power pulse forming means for conducting said pulses, capacity means receiving the pulses from the unilateral impedance means, a high frequency oscillator energized by the capacity means, and oscillator control means operative synchronously with the power pulse forming means to block oscillation of the oscillator throughout conduction of the unilateral impedance and to operate the oscillator to generate only a relatively short high frequency pulse at another phase of each recurrence period.

7. A transmitter for high frequency pulses comprising a source of direct current, inductance means, switch means recurrently operative to connect the inductance means across the source for a charging interval and thereafter disconnect the same to generate a power voltage pulse, unilateral impedance means connected with the inductance means for conducting said pulses, capacity means receiving said pulses from the unilateral impedance means, a high frequency oscillator energized by the capacity means, and oscillator control means recurrently operative at the recurrence rate of the switch means to operate the oscillator only through a minor portion of each recurrence period and to block oscillation during the rest of the recurrence period to generate a single high frequency wave train pulse during each period.

8. A high frequency discrete pulse transmitter comprising a source of direct current, inductance means, switch means recurrently operative to connect the inductance means across the source for a charging interval and thereafter disconnect the same to generate a power voltage pulse, a normally inoperative high frequency oscillator, and a feed circuit coupling the oscillator with the inductance means to apply recurrent energization pulses to the oscillator in definite time relation to operation of the switch means, the oscillator comprising circuit means operative under the pulse energization to effect generation of a multiple cycle high frequency wave train during each energization pulse and to terminate oscillator operation substantially synchronously with the end of each energization pulse whereby the interval between high frequency wave trains is substantially the same as the interval between energization pulses.

References Cited in the file of this patent

UNITED STATES PATENTS

| | | |
|---|---|---|
| 1,672,215 | Heising | June 5, 1928 |
| 1,695,042 | Fearing | Dec. 11, 1928 |
| 1,837,144 | Bethenod | Dec. 15, 1931 |
| 2,113,214 | Luck | Apr. 5, 1938 |
| 2,137,351 | Schlesinger | Nov. 22, 1938 |